Oct. 7, 1969 R. G. ZENICK 3,470,604
METHOD OF MAKING A HYPODERMIC NEEDLE
Filed July 1, 1966

INVENTOR
RAYMOND G. ZENICK
BY
Larry N. Barger
ATTORNEY 3,470,604
METHOD OF MAKING A HYPODERMIC NEEDLE
Raymond G. Zenick, Glendale, Calif., assignor, by mesne assignments, to American Hospital Supply Corporation, a corporation of Illinois
Filed July 1, 1966, Ser. No. 562,335
Int. Cl. B23p *11/02, 19/02*; A61m *5/32*
U.S. Cl. 29—447                                      6 Claims

ABSTRACT OF THE DISCLOSURE

The method of producing a hypodermic needle assembly including the steps of rolling onto the butt-end of a sharpened cannula a plurality of notched ribs; axially press-fitting the butt-end of the cannula into the undersized bore of a thermoplastic hub at a force of about 1½ to 2 pounds of force, in which the hub is produced from a moisture-absorbing thermoplastic such as nylon or the like and has been expanded by heating and/or saturated with moisture to about 10% residual moisture capacity so that the hub bore is softened; and permitting the hub to cool and dry at room temperature whereby residual moisture capacity is about 2% and a force approximately 10 times the installation force is required to pull the cannula axially from the hub.

---

This invention relates to a new method of making a hypodermic needle without using epoxies or other adhesives. More particularly this invention relates to a method of preparing and assembling a cannula and a thermoplastic hub for a liquid-tight mechanical fit.

Previous attempts have been made to eliminate the costly step of cementing a metal cannula to a needle hub with epoxy. One proposed method included placing the cannula on a mandrel and driving the cannula and mandrel through a thermoplastic hub without a preformed bore in the hub. Others have tried to make special injection-type molds which could hold a cannula allowing a thermoplastic hub to be molded right to the cannula.

In my invention I have found a unique method of preparing the cannula and the thermoplastic hub. The prepared cannula and hub are axially press fitted together with a small force. Once assembled the hub and cannula cannot be pulled apart except by an axial force many times greater than the assembling force.

One of the important elements in my invention is a special hub treating step. A thermoplastic hub with a cannula receiving bore smaller in diameter than the cannula is subjected to either a heat treatment or a water treatment prior to assembling the hub to the cannula.

The different steps in my unique method of making a hypodermic needle can best be understood by referring to the following drawings, in which.

Figure 1:
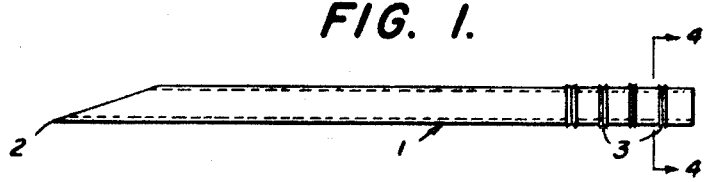
FIGURE 1 is a side elevational view of the cannula.
Figure 4:
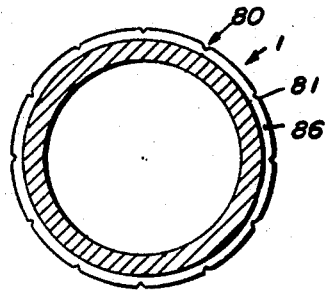
FIGURE 4 is an enlarged sectional view taken along line 4—4 of FIGURE 1.

In the first step of my invention a cannula 1 shown in FIGURE 1 is formed from stainless steel tubing. At a first end a beveled piercing point 2 is formed. At an opposite second end of cannula 1, ridges 3 encircling the cannula are formed by rolling the cannula under a sharp knife-edged instrument. The sharp knife edge of this instrument forms at least one small groove in the surface of the cannula and pushes metal from the cannula surface into small upstanding ridges 86 bordering the groove. As shown in FIGURE 4, the ridges exaggerated in size are preferably formed with interruptions 80 and 81 to keep the cannula from rotating relative to the hub. These interruptions 80 and 81 can be notches or protrusions in the ridge's surface made by corresponding barbs or nicks in the instrument's knife edge.

The hub 10 is formed of a thermoplastic material using conventional injection molding techniques. Hub 10 is formed with a cannula-receiving bore 11 which is smaller in diameter than the outside diameter of cannula 1. The amount of undersize of cannula-receiving bore 11 depends on the particular size or gauge of cannula 1. In a 21-gauge cannula with an outside diameter of 0.031 inch the cannula-receiving bore 11 can be as much as 0.015 inch undersized diametrically with 0.008 to 0.010 inch being preferred. These dimensions are based on the cannula's outside diameter prior to the formation of the upstanding ridges bordering the grooves. The outside diameter of the cannula measured across tops of these upstanding ridges 86 is 0.003 to 0.008 inch greater than the cannula's initial outside diameter. Thus, in the preferred range, the interference fit is 0.011 to 0.018 inch at the top of the upstanding ridges.

Once the hub is formed it is then softened by heat or water or both. Hub 10 can be heated to a temperature above 150° F. but below the melting point of the particular thermoplastic material. While the hub of a material such as nylon, high density polyethylene or polypropylene is at this elevated temperature, it is axially wedged over the peripheral grooves 3 and ridges 86 of cannula 1. This assembly can be done with an axial force of from one and one-half to two pounds. The hub then cools and an inside surface of cannula-receiving bore 11 shrinks slightly and very tightly grips the surface of cannula 1 between spaced ridges 86. Once the assembled needle has cooled to room temperature it takes approximately twenty pounds to pull the cannula from the hub. A hypodermic needle requiring this large amount of force to separate the cannula and hub is considered safe for medical uses.

Figure 2:
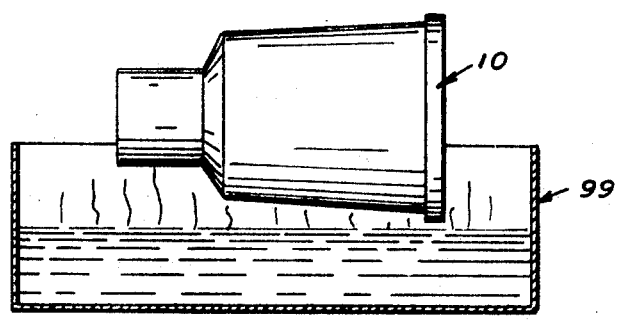
FIGURE 2 is a side elevational view of a hub going through the hub treating step.
Figure 3:
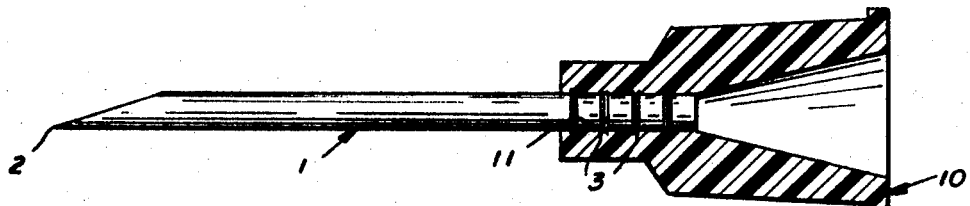
FIGURE 3 is a side elevational view of the assembled hub and cannula with the hub shown in section.

I have found that hubs molded of nylon are particularly suited for softening with water. FIGURE 2 shows water in a container 99 for treating the hubs. If I soak the nylon hubs in water or subject them to steam treatment, the water content of the nylon increases from a residual amount of approximately two percent to a much higher level of from nine to ten percent. The water treated nylon hub slips onto the cannula with from one and one-half to two pounds of axial force. Subsequent drying of the hubs removes the excess water and the hub shrinks down and tightly grips the cannula 1.

In the above specification I have used specific embodiments to explain my invention. However, it is understood that those skilled in the art can make certain modifications to these embodiments without departing from the spirit and scope of this invention.

I claim:

1. The method of producing a hypodermic needle assembly including a terminally sharpened metal cannula of stainless steel or the like extending axially from a plastic hub and is retained therein substantially against rotation and axial withdrawal, comprising the steps of:
    (A) deforming at the butt-end of a terminally sharpened metal cannula at least one circumferentially interrupted rib extending radially from the cannula;
    (B) producing a hypodermic needle hub with a butt-receiving bore undersized from approximately 0.008 to 0.015 inch with respect to the cannula diameter and using a moisture-absorbing thermoplastic of the class of nylon, high density polyethelene or polypropylene as the material from which the hub is formed;
    (C) heating and introducing excess residual moisture into the hub so that the hub is softened;

(D) axially press-fitting the cannula-butt into the hub bore with a relatively light axial assembly force; and (E) permitting the hub to cool and dry at room temperature causing the hub to shrink and the bore to be reduced to substantially its original size and thereby interlock said rib in said hub bore against rotation and axial movement by eliminating substantially all excess residual moisture and so an axial destructive force at least several times greater than the axial assembly force is required to pull the cannula from the hub bore.

2. The method as claimed in claim 1 in which said moisture absorbing thermoplastic is one in which the normal residual moisture is approximately 2% and the cannula is assembled in the hub bore when the hub has approximately 10% residual moisture content.

3. The method as claimed in claim 1 in which said circumferential rib is formed by rolling the cannula-butt end beneath a knife-edge having spaced interruptions therealong whereby a groove is formed adjacent the rib.

4. The method as claimed in claim 1 in which said hub is heated to a temperature above 150° F. and below the melting point of the thermoplastic material prior to axial assembly of the cannula-butt in the hub bore.

5. The method as claimed in claim 1 in which the hub is saturated with excess residual moisture by soaking the hub.

6. The method as claimed in claim 1 in which the hub is saturated with excess residual moisture by subjecting said hub to a steam atmosphere.

References Cited

UNITED STATES PATENTS

| | | |
|---|---|---|
| 1,142,820 | 6/1915 | Knauff. |
| 1,254,161 | 6/1918 | Sawyer _____ 264—249 X |
| 1,919,455 | 7/1933 | Wilson. |
| 2,249,091 | 7/1941 | Robinson et al. |
| 2,461,132 | 2/1949 | Urschel et al. |
| 2,494,290 | 1/1950 | Erhard _____ 29—525 X |
| 3,029,815 | 4/1962 | Roehr _____ 128—221 |

FOREIGN PATENTS 712,859   8/1954   Great Britain.

CHARLIE T. MOON, Primary Examiner

U.S. Cl. X.R.

264—249; 128—221; 29—525